United States Patent [19]

Harwell et al.

[11] Patent Number: 4,770,906
[45] Date of Patent: Sep. 13, 1988

[54] PRODUCING POLYMERIC FILMS FROM A SURFACTANT TEMPLATE

[75] Inventors: Jeffrey H. Harwell; Edgar A. O'Rear, both of Norman, Okla.

[73] Assignee: The Board of Regents for the University of Oklahoma, Norman, Okla.

[21] Appl. No.: 725,007

[22] Filed: Apr. 19, 1985

[51] Int. Cl.$^4$ .......................... B05D 3/02; B05D 7/00
[52] U.S. Cl. .................................... 427/212; 427/302; 427/385.5
[58] Field of Search ............... 428/403, 404, 407, 461; 427/221, 212, 299, 302, 385.5

[56] References Cited

U.S. PATENT DOCUMENTS

| | | | |
|---|---|---|---|
| 3,971,753 | 7/1976 | Frechtling et al. | 428/406 X |
| 4,501,793 | 2/1985 | Sarada | 428/315.5 |
| 4,608,401 | 8/1986 | Martin | 523/205 |

OTHER PUBLICATIONS

Harwell, Hoskins, Schecter & Wade, "Pseudophase Separation Model for Surfactant Sorption Isomerically Pure Surfactants", *Langmuir*, vol. 1, No. 2, pp. 251-262, 1985.
Allara & Nuzzo, "Spontaneously Organized Assemblies", (2 parts), *Langmuir*, vol. 1, No. 1, pp. 45-66 (1985).
J. Fendler, "Polymerized Surfactant Vesicles: Novel Membrane Mimetic Systems", *Science*, vol. 223, pp. 887-894 (Mar. 1984).
M. Almgren & S. Swarup, "Size of Sodium Dodecyl Sulfate Micelles in the Presence of Additives", *J. Coll. Interface Sci.*, vol. 91, No. 1, pp. 256-266 (Jan. 1983).
J. Olmsted & M. Strand, "Fluorescence of Polymerized Diacetylene Bilayer", *J. Phys. Chem.*, vol. 87, pp. 4790-4792 (1983).
K. O'Brien, et al., "Polymerization of 16-Heptadecenoic Acid Monolayers", *Thin Solid Films*, vol. 102, pp. 131-1140 (1983).
S. Regen, et al., "Polymer-Supported Membranes, A New Approach for Modifying Polymer Surfaces", *Macromolecules*, vol. 16, No. 2, pp. 335-338 (1983).
L. Gan, et al., "Polymerization of Styrene in Water-Alcohol-Ionic Surfactant Solutions", *J. Macromol. Sci.--Chem.*, A19(5), pp. 739-756 (1983).
L. Gan & C. Chew, "Polymerization in the Transparent Water-in-Oil Solutions (I). Methyl Methacrylate and the Copolymerizable Cosurfactant", *J. Dispersion Sci. & Tech.*, vol. 4, No. 3, pp. 291-312 (1983).
L. Netzer, et al., "Adsorbed Monolayers versus Langmuir-Blodgett Monolayers-Why and How? I. From Monolayer to Multilayer by Adsorption", *Thin Solid Films*, vol. 99, pp. 235-241 (1983).
L. Netzer, et al., "Adsorbed Monolayers v. Langmuir-Blodgett Monolayers-Why and How? II. Characterization of Built-up Films Constructed by Stepwise Adsorption of Individual Monolayers", *Thin Solid Films*, vol. 100, pp. 67-76 (1983).
L. Netzer & J. Sagiv, "A New Approach to Constr. of Artificial Monolayer Assemblies", *J. Am. Chem. Soc.*, vol. 105, No. 3, pp. 674-676 (1983).
J. Harwell, *Surfactant Adsorption and Chromotographic Movement with Application in Enhanced Oil Recovery*, Doctoral Dissertation, publ. 1983 at U. of Texas, Austin, Chap. Two and Table of Contents.
C. Nunn, et al., "Visual Evidence Regarding the Nature of Hemimicelles Through Surface Solubil. of Pinacyanol Chlor.", *J. Phys. Chem.*, vol. 86, pp. 3271-3272 (1982).
J. Scamehorn, et al., "Adsorption of Surfactants on Min. Oxide Surfaces from Aqueous Solutions", *J. Coll. Interface Sci.*, vol. 85, No. 2, pp. 463-478 (1982).
D. O'Brien, et al., "The Photopolymerization of Lipid-Diacetylenes in Bimolecular Layer Membranes", *J. Polym. Sci.*, P. Ch. Ed., vol. 19, pp. 95-101 (1981).
B. Tieke, et al., "Topochemical Reactions in Langmuir-Blodgett Multilayers", III., *Interfacial Synthesis*, C. Carraler and J. Preston, eds., M. Dekker, Inc., N.Y. (1981).
A. Barraud, et al., "Polymerized Monomolecular Layers: A New Class of Ultrathin Resisn for Microlithography", *Thin Solid Films*, vol. 68, pp. 91-98 (1980).
J. Sagiv, "Organized Monolayers by Adsorption 1. Form and Structure of Oleophobic Mixed Monolayers on Solid Surfaces", *J. Am. Chem. Soc.*, vol. 102, No. 1, pp. 92-98 (1980).
F. Trogus, et al., "Adsorption of Mixed Surfactant Systems", *J. Pet Tech.*, vol. XXXI, pp. 769-778 (Jun. 1979).
D. Day & H. Ringsdorf, "Polymerization of Diacetylene Carbonic Acid Monolayers at the Gas-Water Interface", *J. Poly. Sci, Poly.* Ltrs. Ed., vol. 16, pp. 205-210 (1978).
V. Enkelmann & J. Lando, "Polymer. of Ordered Tail-to-Tail Vinyl Stearate Bilayers", *J. Polym. Sci., Pol. Chem. Ed.*, vol. 15, pp. 1843-1854 (1977).

(List continued on next page.)

Primary Examiner—Michael R. Lusignan
Attorney, Agent, or Firm—Dunlap, Codding & Peterson

[57] ABSTRACT

A method for producing polymeric films in which a substrate surface is contacted with a surfactant solution, comprising a liquid in which at least a first surfactant is dissolved, so that an interface is formed between the substrate surface and the surfactant solution, under conditions which promote the assembly at such interface of surfactant molecules, such assembled molecules defining a surfactant template for the film to be produced. After monomer molecules have become concentrated within the surfactant template, polymerization is effected to produce an ultrathin polymeric film dimensionally determined by the surfactant template. Such film is characterized by a polymer network disposed within a surfactant template. The method of the present invention may be used to coat the surface of an object, such as an object which is porous or has non-planar surfaces, or may be used to coat particulate matter.

36 Claims, No Drawings

OTHER PUBLICATIONS

S. Letts, et al., "Polymer. of Oriented Monolayers of Vinyl Stearate", *J. Coll. Interface Sci.*, vol. 56, No. 1, pp. 64-75 (Jul. 1976).

G. Goujon, et al., "On the Adsorption of N-Dodecyl-Ammonium Chlor. on the Surface of Synthetic Calcite", *J. Coll. Inter. Sci.*, vol. 56, No. 3, pp. 587-595 (1976).

D. Fuerstenau & T. Wakamatsu, "Effect of pH on the Adsorption of Sodium Dodecanesulphonate at the Alumina/Water Interface", *J. Chem. Soc. (Faraday Discussions)*, vol. 59, pp. 157-180 (1976).

S. Dick, et al., "Adsorption of Alkulbenzene Sulfonate Surfactants at the Alumina Water Interface", *J. Coll Inter. Sci.*, vol. 39, No. 3, pp. 595-602 (1971).

P. Mukerjie, "Analysis of Distr. Model for Micell. Solubil. Using Thermodynamics of Small Systems: Non-Ideality of Solubil. of Benzoic Acid Deriv. in Nonionic Surfactants", *J. Pharm. Sci.*, vol. 60, No. 10, pp. 1531-1534 (Oct. 1971).

A. Blumstein, "Polymerization in Preoriented Media", *Adv. in Macromol. Chem.*, W. Parsikas, ed., Acad. Press, N.Y., pp. 123-148 (1970).

P. Somasundaran & D. Fuerstenau, "Mech. of Alkyl Sulfonate Adsorption at the Alumina-Water Interface", *J. Phys. Chem.*, vol. 70, No. 1, pp. 90-96 (1966).

P. Mukerjie, "Solubilization in Aqueous Micellar Systems", *Sol. Chem. of Surfactants*, K. Mittal, ed., vol. 1, p. 153, Plenum Press, N.Y. (1979).

J. Cases, et al., "Adsorption of N-Alkylamine Chlor. on Heterogenous Surfaces", AICHE Symp. Series, vol. 71, No. 150, pp. 100-109 (1975).

Proposal to the Natl. Sci. Foundation sub. in 1983, by J. Harwell, Inves/Dir., req. Funding for res. at Okla. Univ.

Research in the New CEMS, "Surfactant Adsorption Used for a New Separations Process", J. H. Harwell, OU Schl. Chem Eng. & Mat. Sci., 1983, pp. 4-5.

PRODUCING POLYMERIC FILMS FROM A SURFACTANT TEMPLATE

FIELD OF THE INVENTION

The present invention relates generally to ultrathin polymeric films and methods for producing such films.

SUMMARY OF THE INVENTION

A substrate surface is contacted with a surfactant solution, comprising a liquid in which at least a first surfactant is dissolved, so that an interface is formed between the substrate surface and the surfactant solution, under conditions which promote the assembly at such interface of surfactant molecules, such assembled molecules defining a surfactant template for the film to be produced. Molecules of at least a first monomer, soluble in the surfactant bilayer, are contacted with the surfactant template under conditions permitting monomer molecules to become concentrated within the surfactant template. Finally, the monomer molecules are polymerized to form a polymeric film dimensionally determined by the surfactant template.

A polymeric film is produced which is characterized by at least one polymer network disposed within a surfactant template. The method and film of the present invention may be used to coat the surface of objects, such as objects having non-planar surfaces, porous objects, or to coat particulate matter.

DESCRIPTION OF THE PREFERRED EMBODIMENT

The present invention is directed to ultrathin polymeric films and to methods of preparing and using such films. The method of the present invention permits the convenient production of ultrathin films from common, commercially available chemicals. Such films possess a high degree of two-dimensional homogeneity and may have thicknesses equal to the length of one or two surfactant molecules. Thus, these films may be constructed so as to display a wide variety of chemical properties and to be suitable for many uses, including photoresists for microcircuit manufacturing, corrosion barriers, solid lubricants, chemical separation membranes, adsorbents and protective coatings for magnetic discs and tapes.

The present invention allows an ultrathin coating to be applied to various surfaces, such as the surface of an object having an irregular, recessed or non-planar surface area. The film may also be applied to granular and particulate matter. The film may be constructed directly on the surface on which it is to be used. Also, it may be constructed on one surface and then delaminated and transferred to another surface.

The method of the present invention involves the use of several elements, including a substrate on which the film is formed, at least one surfactant in solution, one or more monomers, and often other chemicals and methods used to initiate polymerization of the monomers. The combination of components in any system will be determined primarily by the chemical properties desired in the film to be produced. The claims of the present invention are intended to include in their scope a wide variety of substrate-surfactant-monomer-solvent combinations.

FORMATION OF SURFACTANT TEMPLATE

In accordance with the present invention, a desirable surfactant-substrate combination is identified for formation of a surfactant template which will define the polymeric film to be produced. The substrate surface, when contacted with a surfactant solution so as to form an interface, serves as a platform on which surfactant molecules are assembled to form the template. In many instances, the template preferably is substantially complete, as opposed to comprising patches, and is substantially coextensive with the interface.

The substrate comprises a liquid or a solid, preferably a solid, and more preferably a solid having a polar surface, such as an oxidized metal. One suitable substrate comprises particulate matter, such as alumina powder, having a large surface area relative to its weight. If a liquid substrate is used, the liquid substrate must be immiscible with the selected surfactant in solution in order for an interface to be formed.

At least a first surfactant and a solvent are selected for use with the selected substrate. The solvent of the surfactant solution further comprises a liquid in which the selected surfactant molecules, in sufficient concentration (at or above critical micelle concentration), will aggregate into micelles. In most systems, the solvent of the surfactant solution will be water.

The first surfactant may be cationic or anionic and may be dissolved in a polar or non-polar solvent. The combination of surfactant and solvent is determined by the desired structure of the template. For example, if a surfactant monolayer is desired, a polar substrate surface having a negative charge may be combined with a cationic surfactant in a non-polar solvent. In such a system, a single layer of surfactant molecules will assemble head-down on the substrate surface with their hydrophobic tails extending away from the surface and into and toward the solution. This head-down/tail-up assembly of the surfactant molecules will result in a hydrophobic film. A hydrophilic surfactant monolayer could be formed by using a polar solvent with a non-polar substrate surface, as this will orient the surfactant molecules in a head-up/tail-down position relative to the substrate surface.

On the other hand, if a template comprising a bilayer of surfactant molecules is desired, a positively charged substrate surface, such as aluminum oxide in contact with an acidic solution, could be used with an anionic surfactant, such as sodium dodecyl sulfate, in a polar solvent. The polarity of the solvent will cause a second layer of surfactant molecules to assemble tail-to-tail with the surfactant molecules directly adsorbed on the substrate surface. Thus, the hydrophilic heads of the second layer of surfactant molecules extend toward the solution. Similarly, a substrate having a negatively charged surface combined with a cationic surfactant in a polar solvent will cause the formation of a tail-to-tail bilayer of surfactant molecules. In most instances, a bilayer of surfactant molecules will be a preferred surfactant template.

In some instances where a copolymer film is to be produced, a surfactant, or a plurality of surfactants, may be selected, molecules of such surfactant comprising copolymerizable subunits. In such case, the polymerization step of the method of the present invention preferably is carried out by copolymerizing the surfactant molecule subunits with the monomer molecules concentrated within the surfactant template.

In order to prevent micelle formation of surfactant molecules, and the polymerization of such micelles in the surfactant solution to be prepared, the concentration of surfactant in solution, preferably is less than the critical micelle concentration of the selected surfactant in the selected solvent. The critical micelle concentration determination may be made using a conductivity versus concentration plot. Conductivity of the surfactant solution may be measured by an RC-20 Solu-Bridge Conductivity Meter (Beckman Instruments Inc., Cedar Grove, N.J.).

Conditions of the substrate and surfactant solution are next determined which will promote assembly of surfactant molecules at the interface between the selected surfactant solution and substrate surface, so as to form the surfactant template. Preferably, the surfactant template comprises surfactant molecules assembled in a bilayer which is substantially complete and substantially coextensive with the interface.

In order to drive the assembly of surfactant molecules to such completion, the surface charge density of the selected substrate preferably is determined and altered by physical, chemical, or other suitable means, to maximize the number of surfactant molecules assembled at the interface. The surface charge density may be altered chemically by altering the pH of the surfactant solution, or by the introduction in such solution of other potential-determining ions and counterions, such as electrolytes, including alkali metal and alkaline earth salts.

Another condition which will promote template formation is the presence in the surfactant solution of molecules of a selected second surfactant which will coact with the first surfactant to promote the template formation. Examples of suitable surfactant mixtures include a non-ionic with an ionic surfactant and a cationic with an anionic surfactant.

The surfactant solution preferably is characterized by a pH level and surfactant concentration effective to promote a substantially complete and desirably dense assembly of surfactant molecules on the substrate surface. An effective pH and surfactant concentration for a selected system may be determined simultaneously by conducting a pH "sweep". Samples of known amounts of the selected substrate preferably are contacted with samples of surfactant solutions. The solution samples have a pH level ranging from about 1.0 to about 14.0, and characterized by varying concentrations of surfactants. The formation of the surfactant template, which on solid substrates occurs by adsorption, may be measured in each sample by the concentration change method. By comparing the extent to which adsorption occurs in the sample solutions, the pH and the surfactant concentration at which a plateau adsorption of the selected surfactant occurs may be determined. A surfactant solution may then be prepared having the effective pH and surfactant concentration.

If acidic conditions are required to promote template formation, for example, the surfactant solution may be treated with an acid, such as 0.01N hydrochloric acid, in an amount sufficient to achieve the desired pH. In instances where alkaline conditions promote template formation, the surfactant solution may be treated with an alkaline solution, such as 0.01N sodium hydroxide.

If pH alteration is not practical or is not effective by itself to promote template formation, the surfactant solution may further comprise ions capable of altering the surface charge density of the substrate. Such ions comprise the dissociative products of ionic compounds such as alkaline earth and alkali metal salts, including sodium chloride and lithium chloride, and other electrolytes. The introduction of such compounds into the surfactant solution may be used to promote surfactant template formation. For example, when the net (unaltered) surface charge density of the substrate is less than the surface density at which template formation is promoted, the net surface charge density may be increased by a surfactant solution comprising cations, such as lithium and aluminum, which interact strongly with the substrate surface.

The surfactant solution next is contacted with the substrate surface, so that an interface is formed between the substrate surface and the surfactant solution. It should be noted that the constituents of the surfactant solution, such as surfactant(s), acid and/or ionic compounds, may be added in any order and may be added to the liquid before or after the liquid is contacted with the substrate surface.

The means by which the substrate is contacted with the solution will vary according to the surfactant, substrate, solvent and monomer employed in the system. Often it will be desirable simply to immerse the substrate in the surfactant solution within a reaction vessel large enough to accommodate the volume occupied by the substrate and solution. When a volatile monomer, such as styrene, is used, airtight injectable vessels are desirable. Suitable containers of this type include 20 cc borosilicate glass vials sealed by teflon-lined neoprene septa held in place by polypropylene caps.

A known amount of substrate, for example 1.0 g alumina powder, may be placed in a vessel with a substrate solution, such as the sodium dodecyl sulfate solution described above, so that the substrate is submerged. After placement of the substrate and solution in the vessel, the vessel preferably is sealed. Such contacting permits the spontaneous assembly under equilibrium conditions of surfactant molecules on the substrate-solution interface to form the surfactant template.

CONCENTRATION OF MONOMER MOLECULES WITHIN THE TEMPLATE

A monomer solution, comprising a solvent in which molecules of at least a first monomer are dissolved, such monomer molecules being soluble in the surfactant template, is prepared. In some cases, where a copolymer film is to be produced, molecules of a plurality of monomers may be dissolved in the monomer solution.

The monomer solution is contacted with the surfactant template under conditions permitting the monomer molecules to become concentrated within the surfactant template. In most cases it will be preferred to dissolve the surfactant and monomer molecules in a single solution. In such cases, the selected monomer will be introduced into the surfactant solution in an amount sufficient to cause monomer molecules to become concentrated within the surfactant template. It is to be understood that the surfactant and monomer may be introduced into the solution simultaneously or sequentially and in any order.

The concentration of monomer in the monomer solution is sufficient to drive the selected amount of monomer into the surfactant template. The amount of monomer is preferably determined by reference to the surfactant-monomer ratio of the selected system. The partition coefficient of a selected substrate-surfactant-monomer-solvent system preferably is used to ascertain the desired monomer concentration.

In some instances it is preferred to verify the amount of monomer introduced into a known amount of solution, such as by comparing the weight of the solution before and after introduction of the monomer. The resulting concentration of the monomer in solution also may be determined, so that the concentration of monomer molecules within the surfactant template may be verified.

To permit equilibration of the assembly of surfactant molecules at the interface and into a template, and to allow the monomer molecules to become concentrated within the template, the substrate-surfactant-monomer-solvent mixture is allowed to remain at equilibrium preferably for about four days. At the end of this period, and before polymerization is effected, the amount of unassembled surfactant and unconcentrated monomer remaining in the solution may be measured and compared with pre-equilibrium values, to confirm template formation and monomer concentration. confirmed. Such measurement may be carried out by HPLC analysis.

For example, the injectable vials, described above, may be centrifuged, preferably for about 20 minutes at about 1000 rpms to about 2000 rpms. Samples of the supernatant from the spun vials may then be aspirated and injected into an HPLC with a detector, such as a Wescan Model 213A conductivity detector.

The solubility of the monomer (or monomers) within the template may be enhanced by introducing into the monomer solution (or monomer-surfactant solution) a co-solvent, as required to achieve the selected surfactant-monomer ratio in the template. For example, ethanol may be added to an sodium dodecyl sulfate-alumina-sytrene system, either before, after or with other constituents, in an amount sufficient to increase the concentration of styrene molecules within the sodium dodecyl sulfate template without adversely affecting the integrity of the template. For such a system, ethanol solutions of about 0.50M are preferred.

POLYMERIZATION OF MONOMER MOLECULES CONCENTRATED WITHIN THE TEMPLATE

Once the monomer molecules have become concentrated in the surfactant template, the concentrated monomer molecules are polymerized to produce a film dimensionally determined by the surfactant template. While in some instances, polymerization of monomer molecules may occur spontaneously, in most cases it will be necessary to initiate polymerization such as by using heat, light or chemical initiators. Polymerization may comprise cross-linking or branching of the polymer network or networks.

By way of example, a suitable polymerization technique is to combine the use of a chemical initiator, such as azobisisobutyronitrile or persulfate, with heat. Heat may be applied by at least partially submerging the reaction vessel containing the template-coated substrate in a water bath having a temperature of about 60° C. to about 70° C., for about 15-20 minutes.

Polymerization of the concentrated monomers in the template preferably is arrested before the onset of emulsion formation. Prolonged polymerization periods may allow monomers solubilized in bulk phase surfactant micelles in solution, unassembled at the interface—that is, not a part of the template—to be polymerized. The polymerization of micelle-solubilized monomer is evidenced by the appearance of a cloudiness in the surfactant solution. For example, polymerization initiated by heating may be arrested immediately by sudden transfer of the reaction vessel to a cold water bath.

Once polymerization is complete, the film-covered substrate preferably is removed from the reaction container, rinsed (as by distilled water) and dried. If the substrate is a solid article, air drying may be sufficient. In some cases, particularly where the substrate comprises particular matter such as alumina powder, it is preferred to dry the substrate by heating it in an oven, and more preferably in a vacuum oven, for about an hour at about 60° C. to vaporize any excess solvent and unpolymerized monomer molecules.

The following examples illustrate the methods and compositions of the present invention.

EXAMPLES

Alumina powder and sodium dodecyl sulfate were selected as the substrate-surfactant system for experimentation for the reason that these substances, and the monomers and initiating methods appropriate for use with them, were inexpensive and readily available. Alumina powder, having a surface area of 100 m$^2$/g, was obtained from Fisher Scientific Co. (Dallas, Tx.). Sodium dodecyl sulfate, at a purity of 99 percent, was obtained from Sigma Co. (St. Louis, Mo.).

A sodium dodecyl sulfate aqueous solution was prepared having a solute concentration sufficient to allow coverage of the surface area of the selected amounts of powder and yet leave sufficient sodium dodecyl sulfate molecules in solution to maintain the critical micelle concentration. The critical micelle concentration of sodium dodecyl sulfate in solution was determined to be $8.4 \times 10^{-3}$M by using a conductivity versus concentration plot. The conductivity of sodium dodecyl sulfate in solution without other solutes was measured by a RC-20 Solu-Bridge conductivity meter (Beckman Instruments, Inc. (Cedar Grove, N.J.).

In order to determine the amount of sodium dodecyl sulfate to add to the solution to provide the necessary concentration, and to simultaneously determine the pH at which adsorption of sodium dodecyl sulfate molecules would be maximized, a pH "sweep" was performed. Numerous samples of sodium dodecyl sulfate solutions having varying combinations of pH levels, ranging from about 1.0 to abut 12.0, and sodium dodecyl sulfate concentrations, were contacted with constant alumina surface area. (A Fisher Accumet Selective Ion Analyzer, Model 750, was used to measure pH). The extent of adsorption of sodium dodecyl sulfate molecules in each sample was measured by the concentration change method. A plateau adsorption of about 900M/g was found to occur with a sodium dodecyl sulfate solution having a pH of about 4.0 and a sodium dodecyl sulfate concentration of about twice the critical micelle concentration of sodium dodecyl sulfate.

To alter the pH of the sodium dodecyl sulfate solution samples in the pH sweep, 0.01N hydrochloric acid was added dropwise. It was necessary to add the acid in several small amounts allowing the sample solution to reach equilibrium after each addition, as the continued adsorption of sodium dodecyl sulfate molecules resulted in concomitant change in the pH.

Based on the above information, a solution having a pH of about 4.0 and a sodium dodecyl sulfate concentration of about $10^{-4}$M to about $10^{-3}$M was prepared for film forming experiments. Sodium chloride was introduced to the sodium dodecyl sulfate solution in a concentration of about 0.15M. The addition of the sodium chloride was based on what was later determined to be a miscalibration of laboratory equipment. It is now believed that sodium chloride is not necessary to promote complete surface coverage in an alumina-sodium dodecyl sulfate system.

Injectable vials were chosen as reaction vessels for the film forming experiments to prevent the evaporation of styrene, the monomer selected for use with the sodium dodecyl sulfate-alumina system. The vials used were 20 cc borosilicate glass vials, having polypropylene caps with teflon-lined neoprene septa. Varying pre-weighed amounts of alumina powder and 15 cc of the prepared sodium dodecyl sulfate solution were placed in each of 9 vials, which were then sealed.

Styrene at a purity of 99% was obtained from Aldrich Chemical Co. (Milwaukee, Wisc.). A saturating amount of styrene was injected into each vial. The amount of styrene added to each vial was verified by weighing each vial on an analytical balance before and after addition of styrene. The concentration of styrene in the surfactant solution was determined by a Tracor 970A variable wavelength UV detector at 249 nm using a reverse phase silica gel packing and a carrier solution of 50 parts water to 50 parts acetonitrile. As is described below, ethanol was used in two concentrations (0.20M and 0.50M), as a co-solvent for styrene in the vials. A higher concentration of styrene was obtained with the higher co-solvent concentration.

The vials were left at room conditions for about 4 days to allow the adsorption of sodium dodecyl sulfate molecules on the alumina and the concentration of styrene molecules within the adsorbed sodium dodecyl sulfate molecules to reach equilibrium. To assure that such had occurred, supernatant was obtained from each of the 9 vials and analyzed by high performance liquid chromotography (HPLC) for sodium dodecyl sulfate and styrene concentrations. The vials were first centrifuged at 1000-2000 rpms for about 20 minutes. Supernatant was aspirated through the septa using a syringe and then directly injected into an HPLC equipped with a Wescan Model 213A conductivity detector. The HPLC was operated with a column slurry-packed with a reverse phase silica gel silonated with octadecane groups. The solvent gradient used was 25% methanol/distilled-deionized water to 75% methanol/distilled-deionized water. By comparing these results with the pre-adsorption/concentration values for sodium dodecyl sulfate and styrene, the occurence of the surfactant template by adsorption and the occurence of styrene concentration within the template were confirmed.

To facilitate transport of styrene molecules to the alumina surface, ethanol was added to the vials as a co-solvent. In 4 vials ethanol in a concentration of 0.20M was added. In the remaining 5 vials a higher concentration of ethanol, 0.50M was added. The selection of these concentrations was based on earlier test data which demonstrated that ethanol could be utilized as a co-solvent in such systems at a concentration high enough to enhance solubility of styrene but not so high as to adversely affect adsorption of the sodium dodecyl sulfate molecules.

Because polymerization of styrene molecules does not occur spontaneously, initiation was required. Either persulfate or azobisisobutyronitrile was first added to each vial. The vials next were heated in a water bath at 60°-70° C. to initiate polymerization. The heating was continued for about 15-20 minutes, but the reaction was arrested before the onset of emulsion formation and bulk polymerization, evidenced by appearance of cloudiness in the supernatant. The reaction was arrested by immersing the vials in cold water.

Following the cold water immersion, the vials were centrifuged and the supernatant removed by pipette aspiration. The alumina was then rinsed with distilled, deionized water to remove remaining surfactant solution, and air dried.

After air drying, the alumina samples were placed in an oven at 60° C. for about 1 hour to vaporize any excess water and unpolymerized styrene. For analysis, the samples were transferred to a carbon tetrachloride ($CCl_4$) solution and the mixture was allowed to equilibrate. The equilibrated mixture was analyzed by UV spectrophotometry using a Spectronic 1001 (Bausch & Lomb, Rochester, N.Y.). The results of this analysis were compared with the results of similar analysis of solutions of separately prepared polystyrene dissolved in $CCl_4$. The peak shift in UV spectrum of the alumina samples were comparable to the peak shift of the control procedures; i.e., the peak shift of the transformation of the conjugated styrene chromophore to the unconjugated polystyrene chromophore. Based on these results, it was concluded that the styrene molecules which had become concentrated within the layer of adsorbed sodium dodecyl sulfate molecules had been polymerized.

Table 1 summarizes pertinent data obtained on the above described alumina powder samples.

TABLE 1

Film Forming Experiments Using Sodium Dodecyl Sulfate (SDS) as Surfactant, Alumina Powder as Substrate and Styrene (with Ethanol) as Monomer[1]

| Vial No. | Amount Alumina Powder (g)[2] | Initial/Final SDS Conc. in Solution (μM) | Amount SDS Adsorbed (μM)* | Initial/Final Styrene Conc. in Solution (μm) | Amount Styrene Concentrated in Template (μm)* | Styrene/SDS Ratio in Template | Conc. of Ethanol Added (M) | $K_{as}$[3] |
|---|---|---|---|---|---|---|---|---|
| 1 | 1.00 | 5900/180 | 86 | 3800/? | ? | ? | 0.20 | ? |
| 2 | 0.50 | 5900/185 | 86 | 3800/1350 | 36.8 | 1:2.34 | 0.20 | 317 |
| 3 | 0.25 | 5900/200 | 85.5 | 3800/1440 | 35.4 | 1:2.42 | 0.20 | 288 |
| 4 | 0.10 | 5900/900 | 76.5 | 3800/1500 | 34.5 | 1:2.22 | 0.20 | 300 |
| 5 | 1.00 | 5900/208 | 85.4 | 4374/1816 | 38.5 | 1:2.22 | 0.50 | 248 |
| 6 | 0.50 | 5900/270 | 84.5 | 4374/1631 | 41.2 | 1:2.05 | 0.50 | 299 |
| 7 | 0.30 | 5900/349 | 83.3 | 4374/1635 | 41.1 | 1:2.03 | 0.50 | 302 |
| 8 | 0.22 | 5900/389 | 82.7 | 4374/1598 | 41.6 | 1:1.99 | 0.50 | 316 |

TABLE 1-continued

Film Forming Experiments Using Sodium Dodecyl Sulfate (SDS) as Surfactant, Alumina Powder as Substrate and Styrene (with Ethanol) as Monomer[1]

| Vial No. | Amount Alumina Powder (g)[2] | Initial/Final SDS Conc. in Solution ($\mu$M) | Amount SDS Adsorbed ($\mu$M)* | Initial/Final Styrene Conc. in Solution ($\mu$m) | Amount Styrene Concentrated in Template ($\mu$m)* | Styrene/SDS Ratio in Template | Conc. of Ethanol Added (M) | $K_{as}$[3] |
|---|---|---|---|---|---|---|---|---|
| 9 | 0.10 | 5900/670 | 78.4 | 4374/1783 | 38.9 | 1:2.2 | 0.50 | 278 |

[1] 15 cc of SDS aqueous solution having 0.15 M NaCl concentration was contacted with the alumina substrate in 20 cc borosilicate glass injectable vials.
[2] Alumina powder surface area equaled 100 m²/g.
[3] The equilibrium constant, $K_{as}$, a partition coefficient analogous to partition coefficients used in solubilization studies, equals the ratio of monomer molecules to surfactant molecules within the template divided by the concentration of monomer remaining in solution after equilibration.
*Amounts adjusted to account for ratio of solution volume to substrate surface area.

The dramatic reduction in the amount of sodium dodecyl sulfate remaining in the surfactant-monomer solution after the equilibration period confirmed the adsorption of the surfactant molecules on the alumina surface. Similarly, the reduction in the amount of styrene in solution confirms that monomer molecules became concentrated within the adsorbed surfactant molecules.

The amount of sodium dodecyl sulfate adsorbed per gram of alumina, averaging about 900 $\mu$Mol/g, is consistent with a reasonable packing density of the adsorbed sodium dodecyl sulfate molecules. The ratio of styrene to sodium dodecyl sulfate in the template averaged 2.07. This is consistent with the suggested bilayer formation of the sodium dodecyl sulfate molecule assembly having disposed within it a layer of concentrated styrene molecules.

Experiments similar to those using alumina powder were also conducted using aluminum plates. Sheets of 99.999 percent aluminum having a thickness of about 0.2 mm, obtained from Aesar-Johnson Mathey Inc. (Seabrook, N.H.) were cut into plates of about 1 cm². The plates were cleaned for about 3–5 minutes with tetrahydrofuran solution and then rinsed with distilled, deionized water to remove any oily or other organic materials.

After cleaning and rinsing, plates were placed in vials, contacted with the sodium dodecyl sulfate solution and polymerized using styrene substantially in the same manner as in the alumina powder experiments. However, no ethanol or other co-solvent was utilized with the styrene. Instead, additional amounts of styrene were used in the vials to maintain a styrene layer over the surface of the solution. In this way, activity of styrene within the sodium dodecyl sulfate solution was maintained during equilibration. Following polymerization, the coated plates were simply air dried.

An attempt was made to measure the thicknesses of the films formed on the plates by ellipsometry (Applied Materials, Model AME-500). An average value of 1500Å was obtained. The reliability of this measurement is questionable, however, due to uncertainty as to the value of the dielectric constant of the film.

Further, the polystyrene molecules, being neither branched nor cross-linked, may have retracted into a coiled configuration to reduce the mean end-to-end distance of polymer molecules. Thinner films may be produced by using other monomers, such as acetylenic compounds, exhibiting a superior ability to remain stable in the originally polymerized configuration. The use of cross-linking and branching in the polymerization process would also improve the stability of the films.

The films formed on the plates also were photographed using a PME Inverted Metallurgical Microscope (OLYMPUS TOKYO) at a magnification of 1950×. The photographs showed the presence on each plate surface of a film which was substantially complete and coextensive with the surface area of the plate. However, cracking in the films was also observed. It is believed that the cracking was the result of shrinkage of the film caused by the retraction of the polystyrene network, as discussed above.

Determinations of adsorption by pre- and post-adsorption measurement of sodium dodecyl sulfate concentration were not made for plate samples for the reason that the number of molecules necessary to cover the relatively small surface area of the plates is so small that even complete adsorption on the plates would not measurably affect the sodium dodecyl sulfate concentration of sodium dodecyl sulfate remaining in the solution.

To summarize the experimental data described above, the efficacy of the described method for producing polymeric films using a surfactant template has been demonstrated. The film was applied to substrates having planar surfaces, aluminum plates, and to substrates comprising particulate matter, alumina powder. It is believed that by manipulating the elements of a selected substrate-surfactant-monomer-solvent system, thinner films having improved integrity could be produced.

In accordance with the present invention, a polymeric film is produced which is characterized by at least one polymer network disposed within a surfactant template. Such a film may comprise a copolymer in which a copolymer network is disposed within the surfactant template. Molecules of the surfactant may be polymerized within a polymer network to form a copolymer film.

Based on the foregoing, it is apparent that an object having irregularly shaped surfaces, such as recessed or non-planar surfaces, or such as a porous object, may be coated with the polymeric film of the present invention.

Changes may be made in the nature, composition, operation and arrangement of the various elements, steps and procedures described herein without departing from the spirit and scope of the invention as defined in the following claims.

What is claimed is:

1. A method for producing polymeric films, comprising:
   contacting a substrate surface with a surfactant solution comprising a liquid in which molecules of at least a first surfactant are dissolved, so that an interface is formed between the substrate surface and the surfactant solution, under conditions which promote assembly at such interface of a layer of surfactant molecules, such layer defining a surfactant template for the film to be produced;

contacting the surfactant template with a monomer solution, comprising a solvent in which molecules of at least a first monomer are dissolved, such monomer molecules being soluble in the surfactant template, under conditions permitting monomer molecules to become concentrated within the surfactant template; and polymerizing the concentrated monomer molecules to produce a film dimensionally determined by the surfactant template.

2. The method of claim 1 in which the surfactant template is substantially complete and substantially coextensive with the interface.

3. The method of claim 1 in which the surfactant molecules and the monomer molecules are dissolved in a single solution.

4. The method of claim 3 in which the surfactant template is substantially complete and substantially coextensive with the interface.

5. The method of claim 3 in which the monomer solution further comprises a co-solvent which enhances the concentration of the monomer molecules in the surfactant template.

6. The method of claim 1 in which molecules of a second surfactant are dissolved in the surfactant solution, such second surfactant coacting with the first surfactant to promote the formation of the surfactant template.

7. The method of claim 6 in which the surfactant template is substantially complete and substantially coextensive with the interface.

8. The method of claim 6 in which the first surfactant is nonionic and the second surfactant is ionic.

9. The method of claim 6 in which the first surfactant is cationic and the second surfactant is anionic.

10. The method of claim 1 in which the substrate surface is polar.

11. The method of claim 7 in which the surfactant template is substantially complete and substantially coextensive with the interface.

12. The method of claim 7 in which the liquid is nonpolar and in which the polymeric film produced is hydrophobic.

13. The method of claim 1 in which the substrate surface is non-polar, the liquid is polar and in which the polymeric film produced is hydrophilic.

14. The method of claim 1 in which the first surfactant comprises copolymerizable subunits and in which the polymerization step is carried out by copolymerizing the first surfactant subunits with the concentrated monomer molecules.

15. The method of claim 1 in which the surfactant template comprises surfactant molecules assembled in a bilayer formation.

16. The method of claim 15 in which the surfactant template is substantially complete and substantially coextensive with the interface.

17. The method of claim 1 in which the substrate is solid.

18. The method of claim 1 in which the substrate is a metal oxide.

19. The method of claim 1 in which the liquid of the surfactant solution is water.

20. The method of claim 1 in which the first surfactant is sodium dodecyl sulfate.

21. The method of claim 1 in which the monomer solution further comprises a co-solvent which enhances the concentration of the monomer molecules in the surfactant template.

22. The method of claim 21 in which the co-solvent comprises ethanol.

23. The method of claim 1 in which polymerization is initiated by heat.

24. The method of claim 1 in which polymerization is photoinitiated.

25. The method of claim 1 in which the polymerization is chemically initiated.

26. The method of claim 1 in which the polymerization occurs spontaneously.

27. The method of claim 1 in which the surfactant solution further comprises an agent which is capable of altering the surface charge density of the substrate so as to promote the formation of the surfactant template.

28. The method of claim 1 in which the surfactant solution is characterized by having a pH effective to promote the formation of the surfactant template.

29. The method of claim 28 in which the surfactant solution is acidic.

30. The method of claim 28 in which the surfactant solution is alkaline.

31. The method of claim 27 in which the surfactant solution further comprises ions capable of altering the surface charge density of the substrate.

32. The method of claim 31 in which the ions are the dissociation products of an electrolyte.

33. The method of claim 31 in which the ions are the dissociation products of compounds selected from the group comprising alkaline metal salts and alkaline earth salts.

34. The method of claim 1 in which the monomer solution comprises a solvent in which molecules of a plurality of monomers are dissolved, and in which the polymeric film produced is a copolymer.

35. The method of claim 1 in which the polymerizing step comprises cross-linking of polymer networks.

36. The method of claim 1 in which the polymerizing step comprises branching of polymer networks.

* * * * *